(12) United States Patent
Miller et al.

(10) Patent No.: US 7,077,390 B2
(45) Date of Patent: *Jul. 18, 2006

(54) SUSPENSION STRUT UNIT WITH A HEIGHT-ADJUSTABLE SPRING COLLAR

(75) Inventors: Alexander Miller, Würzburg (DE); Manfred Schuler, Dittelbrunn (DE); Klaus Stretz, Hassfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/759,608

(22) Filed: Jan. 16, 2004

(65) Prior Publication Data

US 2004/0163909 A1 Aug. 26, 2004

(30) Foreign Application Priority Data

Jan. 16, 2003 (DE) ................ 103 01 546

(51) Int. Cl.
*B60G 15/06* (2006.01)
(52) U.S. Cl. ................ 267/221; 267/255; 280/124.151
(58) Field of Classification Search ................ 267/170, 267/177, 179, 33, 286–292, 166, 175, 221, 267/226, 220, 218, 222, 224; 280/124.179, 280/124.151, 124.146, 124.147, 124.145, 280/124.162, 124.164, 124.168; 188/322.19, 188/321.11; 384/420, 124, 130, 607; 265/255
See application file for complete search history.

(56) References Cited

U.S. PATENT DOCUMENTS

| | | | | |
|---|---|---|---|---|
| 2,896,938 A | * | 7/1959 | Walker ................ | 267/221 |
| 3,628,810 A | * | 12/1971 | Graef ................ | 280/6.159 |
| 4,159,105 A | * | 6/1979 | Vander Laan et al. ...... | 267/218 |
| 4,824,180 A | | 4/1989 | Levrai | |
| 4,830,395 A | * | 5/1989 | Foley ................ | 280/124.162 |
| 5,480,128 A | | 1/1996 | Cotter | |
| 5,553,713 A | * | 9/1996 | Sydekum et al. ........... | 267/221 |
| 6,293,533 B1 | * | 9/2001 | Sasse ................ | 267/221 |
| 6,767,010 B1 | * | 7/2004 | Miller et al. ................ | 267/170 |
| 6,854,722 B1 | * | 2/2005 | Causemann ................ | 267/221 |
| 2003/0047399 A1 | | 3/2003 | Miller et al. | |
| 2004/0051270 A1 | * | 3/2004 | Causemann .......... | 280/124.146 |
| 2004/0159993 A1 | * | 8/2004 | Miller et al. ................ | 267/179 |

FOREIGN PATENT DOCUMENTS

| | | | | |
|---|---|---|---|---|
| DE | 3332985 | * | 3/1985 | |
| DE | 85 10 058.7 U1 | | 8/1985 | |
| DE | 3538150 | * | 4/1987 | |
| DE | 3913528 A1 | * | 11/1989 | |
| DE | 197 44 757 A1 | | 4/1999 | |
| DE | 198 51 019 C1 | | 6/2000 | |
| DE | 199 20 017 | | 11/2000 | |

(Continued)

*Primary Examiner*—Thomas J. Williams
(74) *Attorney, Agent, or Firm*—Cohen, Pontani, Lieberman & Pavane

(57) ABSTRACT

Spring strut comprising a cylinder, with respect to which the axial position of a spring collar can be adjusted, where the spring collar has a sleeve section, by which it is connected to the cylinder, where, on the cylinder side, a chamber is provided, which is at least partially filled with a curable material, where the sleeve section is in contact with the curable material, which, when in the solid state, transmits a supporting force from the cylinder to the spring collar, where the chamber has at least one isolating sleeve with a radial guide surface, by which the sleeve is in contact with the sleeve section of the spring collar.

12 Claims, 3 Drawing Sheets

FOREIGN PATENT DOCUMENTS

| | | | |
|---|---|---|---|
| DE | 10301546 B3 | * | 5/2004 |
| FR | 2850148 | * | 7/2004 |
| JP | 04341626 A | * | 11/1992 |
| JP | 11 182609 | | 10/1999 |

* cited by examiner

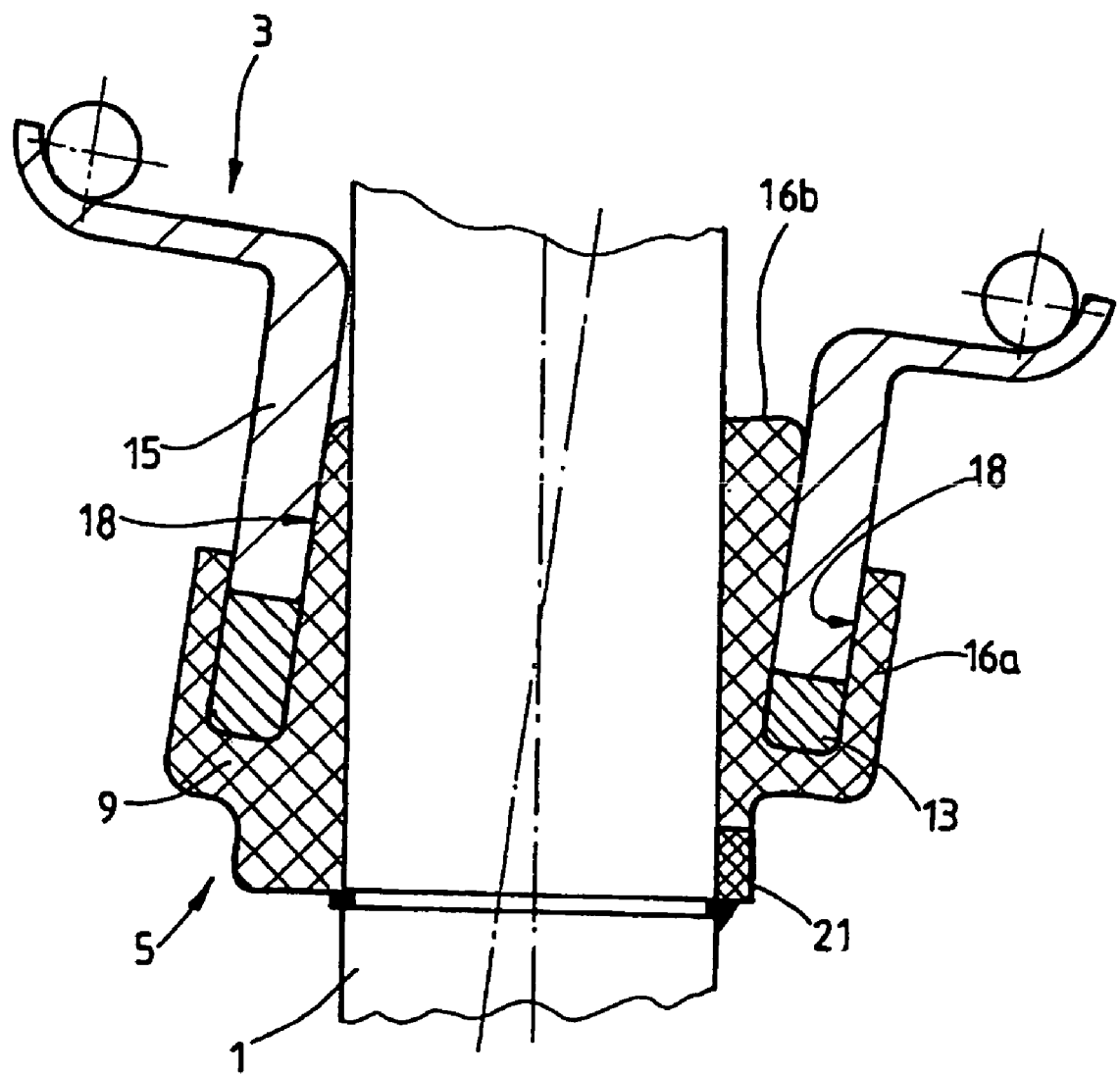

SUSPENSION STRUT UNIT WITH A HEIGHT-ADJUSTABLE SPRING COLLAR

BACKGROUND OF THE INVENTION

1. Field of the Invention

The invention pertains to a suspension strut unit including a cylinder and a height-adjustable spring collar having a sleeve section by which it is connected to the cylinder.

2. Description of the Related Art

A suspension strut unit with a detachable spring collar is known from DE 85 10 058 U1, where the spring collar is supported in a retaining ring. The retaining ring for its own part can be attached independently of the spring collar to the cylinder of the suspension strut unit, together with which it can be coated as a separate structural component. The height of the spring collar is determined by the retaining ring and cannot be changed.

DE 198 51 019 C1 discloses a suspension strut unit with a cylinder, which carries a retaining ring for a spring collar; the height of the collar can be adjusted as desired and then held permanently in position there. The retaining ring is provided with at least one groove, into which at least one circumferential area of a sleeve section of the spring collar can be radially deformed. The degree to which the sleeve section overlaps the groove determines the maximum extent to which the height of the spring collar can be adjusted.

A spring assembly for motor vehicles is also known from DE 197 44 757 A1. In this case, the height of the spring collar can be actively changed by the use of a hydraulic medium. A spring assembly of this type is intended especially for vehicles of the luxury class, in which it must be anticipated that a system for automatically controlling the level of the vehicle body will require the relatively frequent adjustment of the height of the spring collar.

SUMMARY OF THE INVENTION

The object of the present invention is to provide a suspension strut unit with a height-adjustable spring collar, where particular emphasis is placed on the long-term reliability of the unit.

According to the invention, a chamber is provided on the outside of the cylinder, which chamber is at least partially filled with a curable material, and the sleeve section is in contact with the curable material, which, in the solid state, transmits a supporting force from the cylinder to the spring collar. The chamber is defined in part by at least one isolating sleeve with a radial guide surface, by which the sleeve is in contact with the sleeve section of the spring collar.

The curable material can be a plastic material, but metallic materials can also be used. When the height of the spring collar is to be set, it is held in its predetermined position, and an appropriate amount of the curable material is injected into the chamber.

To increase the long-term reliability of the unit, the isolating sleeve prevents the sleeve section from coming into frictional contact with the walls of the chamber during assembly; under certain conditions, such frictional contact could damage a protective surface coating of sealing material by abrasion.

Under consideration of cost and assembly effort, the isolating sleeve should consist of a plastic material. It is effective to use a material for the isolating sleeve that can form a bond with the curable material inside the chamber. In addition, the surface of a plastic is softer than that of a metallic material and will thus leave correspondingly fewer marks on the surface of the cylinder.

It is possible for the chamber on the outside surface of the cylinder to be formed by a support ring, which is permanently connected axially to the cylinder.

In another advantageous elaboration, the support ring has a sleeve and a bottom part, and the sleeve section of the spring collar is at held at least partially inside the sleeve of the support ring.

To ensure ease of access in a device of this type, the support ring has a connecting opening for the curable material.

In a preferred variant, the isolating sleeve is located between the sleeve of the support ring and the sleeve section of the spring collar. The chamber should in this case have the smallest possible gaps between the guide sleeve and the sleeve parts defining the chamber. If the cylinder of the suspension strut unit defines the chamber for the curable material, the sleeve section of the spring collar would have to be designed to fit snugly around the cylinder, which means that, during assembly, abrasive contact could occur between the sleeve section and the cylinder. Simply because an isolating sleeve located between the sleeve section and the cylinder would be shorter that the cylinder, the process of threading the sleeve section onto the isolating sleeve becomes easier, and it is thus also possible to avoid damage to the surface because of the distance of the sleeve section from the cylinder.

Alternatively or in addition, the isolating sleeve could also be located between the cylinder and the sleeve section of the spring collar.

The isolating sleeve can also form a part of the chamber. The design of the support ring would thus become much simpler.

It is also possible for the isolating sleeve to form the bottom part of the support ring.

Finally, a first isolating sleeve can engage with the outside diameter of the sleeve section of the spring collar, and a second isolating sleeve can engage with the inside diameter, these two sleeves being connected to each other by the bottom part. The support ring would thus be formed in its entirety by the isolating sleeve, or, equivalently, the support ring would thus form the isolating sleeve.

It is often a requirement that it be possible to install the spring collar at an angle to the cylinder, so that the elastic forces that act on the suspension strut unit can be compensated. For this purpose, the guide surface of the isolating sleeve for the sleeve section of the spring collar is designed to be at a certain angle to the longitudinal axis of the suspension strut unit.

According to an advantageous embodiment, a fastening ring is connected nonrotatably to the cylinder and to the isolating sleeve after the isolating sleeve has arrived in its final position. This is intended to ensure that elastic forces acting on the spring collar cannot cause the support ring and thus the spring collar to rotate relative to the cylinder.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows an isolating sleeve, which forms the entire support ring, in a slanted position.

FIG. 1A shows an embodiment with an isolating sleeve between the sleeve of the support ring and the sleeve section of the spring collar.

DETAILED DESCRIPTION OF THE PRESENTLY PREFERRED EMBODIMENTS

Figure 1:
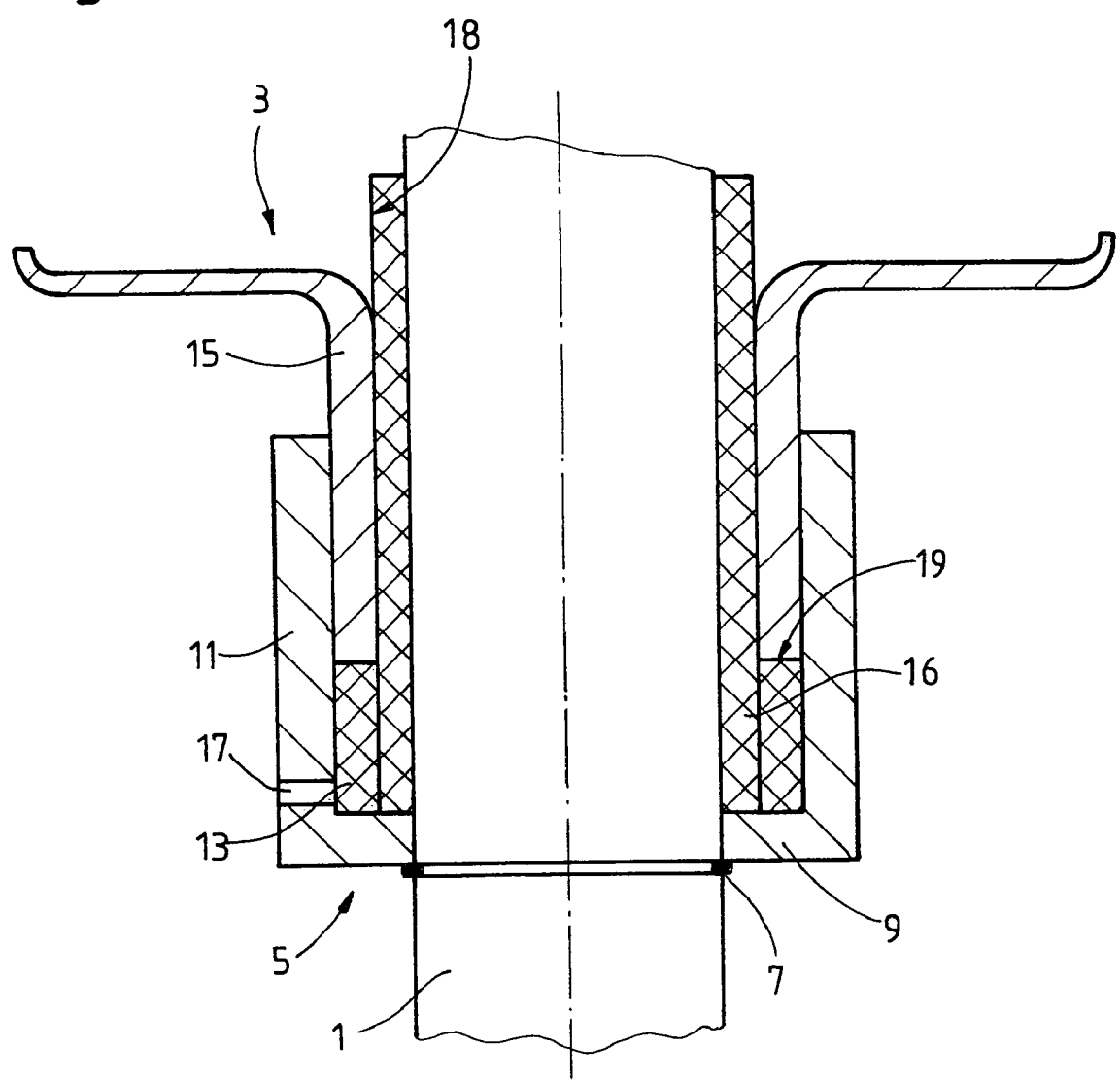
FIG. 1 shows part of a suspension strut unit with at least one isolating sleeve.

FIG. 1 shows only a part of a cylinder 1, which carries a spring collar 3. The cylinder can be part of a vibration damper or of a pneumatic spring. An axially movable piston or a coaxial pressure tube, which contains a working medium, can be provided inside the cylinder.

A support ring 5 is fastened on the outside surface of the cylinder, for which various types of fastening means could be used. In this case, a lock washer 7 is shown in the drawing, but a weld could also be used. The support ring 5 consists of a bottom part 9 and a sleeve 11, so that the support ring and the cylinder cooperate to form a ring-shaped chamber 13. The bottom end of a sleeve section 15 of the spring collar 3 fits into this chamber, in which it can slide in the axial direction. On the cylinder 1, an isolating sleeve 16 is provided, which has a guide surface 18 for the sleeve section. The isolating sleeve 16 is made of plastic, for example, and is provided with a soft surface, so that it will not leave any abrasion marks on the sleeve section 15 or on the cylinder. Alternatively or in combination, as shown in FIG. 1A, an isolating sleeve 26 can also be installed between the sleeve 11 of the support ring and the sleeve section 15 of the spring collar 3. If an isolating sleeve is only present between the support ring 5 and the sleeve section 15, then it is advisable to increase the size of the gap between the sleeve section 15 of the spring collar 3 and the cylinder 1, so that there will not be any abrasive contact between the spring collar 3 and the cylinder 1 when the spring collar is installed. Through a connecting opening 17 in the support ring, the chamber 13 can be filled with a curable material at least up as far as the lower end surface 19 of the sleeve section 15. A liquid plastic can be used as the curable material, or possibly a hardenable metallic material could be used.

If the cylinder 1 is a component of a vibration damper, then a retaining device (not shown) will be set onto the spring collar 3 at the end of the vehicle assembly process, for example, in order to align the vehicle in the horizontal direction. As this is being done, the sleeve section 15 of the spring collar will shift position inside the chamber. After the desired height adjustment has been made, the chamber 13 will be filled with the curable material at least up as far as the bottom end surface 19 of the sleeve section. As soon as the curable material has hardened sufficiently, the retaining device can be removed, and the vehicle will be horizontal regardless of the equipment with which it has been loaded.

Figure 2:
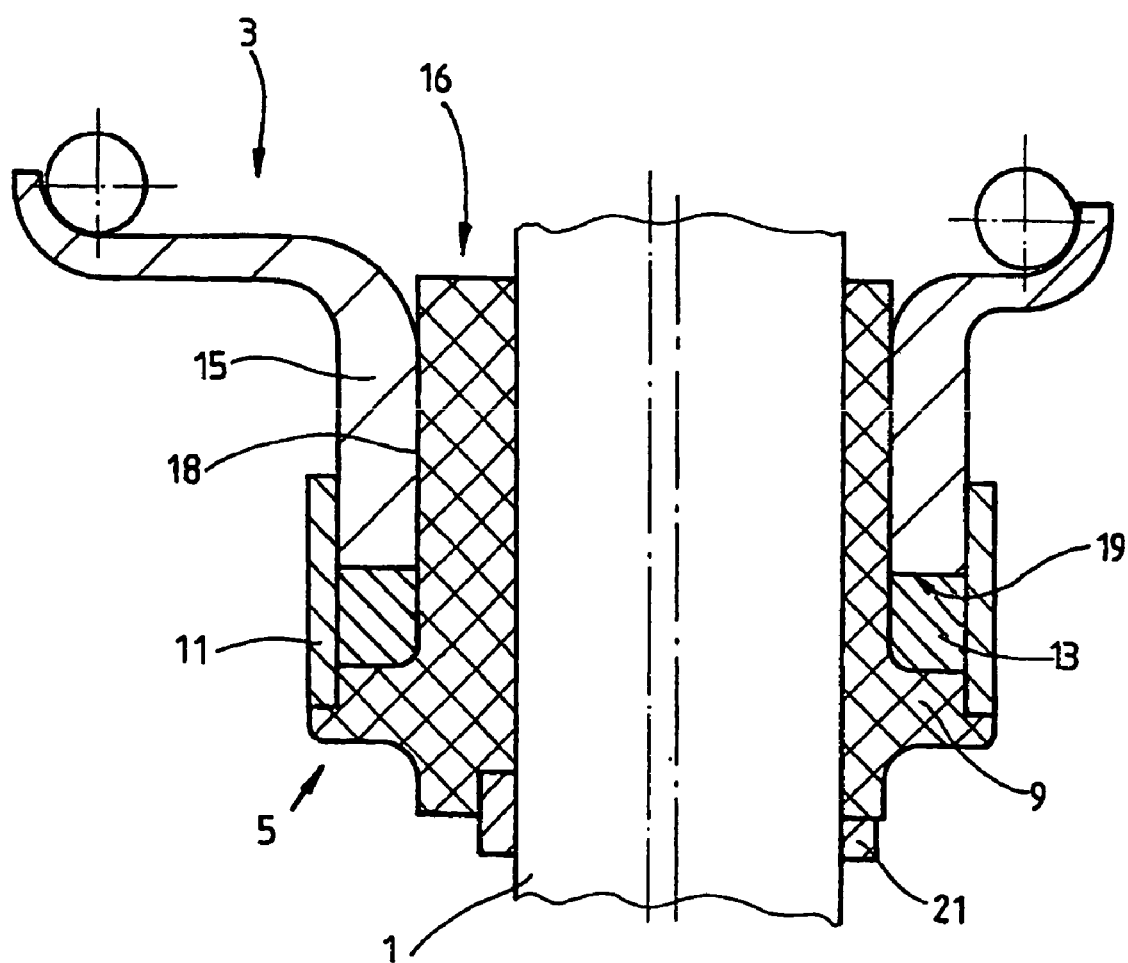
FIG. 2 shows an isolating sleeve with a bottom part.

In FIG. 2, the bottom part 9 of the support ring 5 is also formed by the isolating sleeve 16. Essential parts of the chamber 13 are thus defined by the isolating sleeve. The sleeve 11 represents a separate component of the support ring. A fastening ring 21 supports the bottom part 9 on the cylinder. The fastening ring 21 could, again, be welded to the cylinder. By virtue of the sleeve 16 having a central bore which is offset from the surface 18, the sleeve section 3, whose center line is shown on the left, is arranged eccentrically with respect to the cylinder 1.

Another developmental stage is shown in FIG. 3, according to which design a first isolating sleeve 16a engages with the outside diameter of the sleeve section 15 of the spring collar 3, and second isolating sleeve 16b engages with the inside diameter, the two sleeves being connected to each other by the bottom part 9. Thus the support ring 5 is formed in its entirety by the two isolating sleeves 16a, 16b.

The guide surface 18 of the isolating sleeve for the sleeve section 15 of the spring collar, furthermore, is designed so that it is at an angle to the longitudinal axis of the suspension strut unit 1 in order to compensate for transverse forces acting on the suspension strut unit. It is also possible for a fastening ring 21 to be connected nonrotatably to the cylinder and to the isolating sleeve in the final stage of assembly, so that again, by means of welds, for example, the spring collar can be prevented from rotating with respect to the cylinder.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A suspension strut unit comprising:
a cylinder having an outside;
a chamber provided on the outside of the cylinder;
a spring collar having a sleeve section received in said chamber, said spring collar being adjustable so that the sleeve section is displaceable along said chamber to a level corresponding to a predetermined position of said spring collar relative to the cylinder;
a curable material flowable, prior to curing, into and filling said chamber to said level upon setting said predetermined position of said spring collar so that said curable material, in a solid state, supports an end portion of said sleeve section in said predetermined position of said spring collar and transmits a supporting force from the cylinder to the spring collar; and
an isolating sleeve having a radial guide surface which contacts said sleeve section.

2. The suspension strut unit of claim 1, wherein said isolating sleeve is made of plastic.

3. The suspension strut unit of claim 1, further comprising a support ring which is permanently axially connected to the outside of the cylinder, said chamber being formed by said support ring.

4. The suspension strut unit of claim 3, wherein said support ring comprises a sleeve and a floor, said sleeve section of said spring collar being received between said sleeve and said cylinder.

5. The suspension strut unit of claim 3, wherein said support ring has an opening for injecting said curable material prior to curing.

6. The suspension strut unit of claim 3, wherein said isolating sleeve is located between the sleeve of the support ring and the sleeve section of the spring collar.

7. The suspension strut unit of claim 3, wherein said isolating sleeve is located between the cylinder and the sleeve section of the spring collar.

8. The suspension strut unit of claim 1, wherein said chamber is formed at least in part by said isolating sleeve.

9. The suspension strut unit of claim 8, wherein said isolating sleeve comprises a floor of said chamber.

10. The suspension strut unit of claim 9, wherein said isolating sleeve comprises a first isolating sleeve outside of said of said sleeve section, said unit further comprising a second isolating sleeve between said sleeve section and said cylinder.

11. The suspension strut unit of claim 1, wherein said cylinder has an axis, said radial guide surface having an axis which is at an acute angle to said axis of said cylinder.

12. The suspension strut unit of claim 9, further comprising a fastening ring which is connected non-rotatably to the isolating sleeve and the cylinder.

* * * * *